US008239474B2

(12) United States Patent
Granoff et al.

(10) Patent No.: US 8,239,474 B2
(45) Date of Patent: *Aug. 7, 2012

(54) METHOD AND APPARATUS FOR DETECTING ABUSIVE EMAIL BASED ON NUMBER OF HOPS

(75) Inventors: Mark H. Granoff, Framingham, MA (US); Bruce L. Brown, Jr., Goleta, CA (US); Samuel G. Silberman, Arlington, MA (US)

(73) Assignee: Openwave Systems Inc., Redwood City, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/244,115

(22) Filed: Sep. 23, 2011

(65) Prior Publication Data

US 2012/0016946 A1 Jan. 19, 2012

Related U.S. Application Data

(63) Continuation of application No. 12/711,121, filed on Feb. 23, 2010, which is a continuation of application No. 10/919,655, filed on Aug. 16, 2004, now Pat. No. 7,689,659.

(60) Provisional application No. 60/561,770, filed on Apr. 12, 2004.

(51) Int. Cl.
*G06F 15/16* (2006.01)
*G06F 15/173* (2006.01)

(52) U.S. Cl. ........................................ 709/206; 709/238

(58) Field of Classification Search ........................ None
See application file for complete search history.

(56) References Cited

U.S. PATENT DOCUMENTS

| 6,321,267 | B1 | 11/2001 | Donaldson |
| 6,393,465 | B2 | 5/2002 | Leeds |
| 7,149,778 | B1 | 12/2006 | Patel et al. |
| 7,366,919 | B1 * | 4/2008 | Sobel et al. .................... 726/23 |
| 7,689,659 | B1 | 3/2010 | Granoff et al. |
| 2005/0076241 | A1 | 4/2005 | Appelman |
| 2005/0081054 | A1 * | 4/2005 | Choo ........................... 713/200 |
| 2005/0081059 | A1 | 4/2005 | Bandini et al. |
| 2005/0193073 | A1 | 9/2005 | Mehr et al. |

* cited by examiner

*Primary Examiner* — John B. Walsh
(74) *Attorney, Agent, or Firm* — Morgan, Lewis & Bockius LLP (57) ABSTRACT

A classifier is implemented to determine the number of message transfer agents (MTAs) through which an email message has traveled. If the number of MTAs through which the email message has traveled is below a predetermined threshold and the email message is not otherwise authenticated, the classifier will designate the email message as abusive.

20 Claims, 6 Drawing Sheets

Fig. 7 ved patent US 8,239,474 B2

METHOD AND APPARATUS FOR DETECTING ABUSIVE EMAIL BASED ON NUMBER OF HOPS

RELATED APPLICATION

This application is a continuation of U.S. application Ser. No. 12/711,121, filed Feb. 23, 2010 which is a continuation of U.S. application Ser. No. 10/919,655, filed Aug. 16, 2004 (now U.S. Pat. No. 7,689,659), which claims the benefit of Provisional U.S. patent application No. 60/561,770 filed on Apr. 12, 2004, entitled, "Detection of Email Abuse Based on Number of Hops", which is incorporated herein by reference.

FIELD OF THE INVENTION

The present invention relates generally to electronic mail ("email") and more particularly to a method and apparatus detecting abusive email, such as "spam".

BACKGROUND OF THE INVENTION

Electronic Messaging, particularly email, has become a preferred way of communication for many individuals and organizations. Unfortunately, email recipients are increasingly becoming subject to unsolicited or otherwise unwanted email messages, such as "spam"; such messages are referred to herein as "abusive". There are many anti-spam products on the market today that can help identify abusive email messages. These anti-spam tools work either at the gateway (the corporate mail server and/or ISP) or on the end-user's machine (e.g., a laptop computer, desktop computer, etc.). An increasing number of corporations use both.

Current anti-spam tools usually inspect the whole message—the headers and the body—to come to a determination about the email message. They might be effective in detecting certain specific types of abusive email messages based on their content, such as unsolicited advertisement, virus, etc., but they are not designed to detect general abusive email messages and email messages intended for network resource abuses. Furthermore, inspecting the message body using so-called content filtering demands time and resources and can be easily overcome by spammers by changing the content style. Spammers can also slow down the anti-spam tools by increasing the content volume of the abusive email message.

SUMMARY OF THE INVENTION

The present invention includes a method and apparatus for detecting abusive email. The method, according to certain embodiments of the invention, includes determining the number of message transfer agents through which an email message has traveled, and designating the email message as abusive if a predetermined set of conditions is satisfied. The predetermined set of conditions includes that the number of message transfer agents through which the email message has traveled is below a predetermined threshold and that the email message is not otherwise authenticated.

Other features of the present invention will be apparent from the accompanying drawings and from the detailed description which follows.

BRIEF DESCRIPTION OF THE DRAWINGS

The present invention is illustrated by way of example and not limitation in the figures of the accompanying drawings, in which like references indicate similar elements and in which.

DETAILED DESCRIPTION

A method and apparatus for detecting an abusive email message are described. Note that in this description, references to "one embodiment" or "an embodiment" mean that the feature being referred to is included in at least one embodiment of the present invention. Further, separate references to "one embodiment" in this description do not necessarily refer to the same embodiment; however, neither are such embodiments mutually exclusive, unless so stated and except as will be readily apparent to those skilled in the art. Thus, the present invention can include any variety of combinations and/or integrations of the embodiments described herein.

As described in greater detail below, in one embodiment an Internet Services Provider (ISP) or other Communications Services Provider (CSP) operates a classifier to detect abusive email, such as "spam". Note that "classifier" is just one way of referring to the implementation of the present invention. In general, a classifier can be any processing system, which carries out the present invention. The classifier examines an incoming email message to find out how many Message Transfer Agents (MTAs) the email message has traveled through. Each MTA that a message travels through is known as a "hop". In general, each "hop" is recorded in the email message with a header containing the prefix "Received:". Accordingly, one can get the number of "hops" by inspecting the email message's headers to find out how many headers contain the prefix "Received:". Note that the prefix "Received:" may change in its form, or there may be a new way of recording a "hop" in the future. Therefore, the way of getting the number of "hops" should accordingly be adapted to the desired implementation and messaging protocols being used. In any event, the description here does not limit the present invention to any specific way of getting the number of "hops".

In one embodiment, if a message arrives at the final destination MTA without passing through any MTAs (excluding the final destination MTA) and without any previous session or message authentication, there is a high likelihood that the message is abusive ("spam", for example). The rationale is that legitimate email travels through at least one MTA before arriving at its final destination, as explained further below.

In one embodiment, if the number of MTAs through which the email message has traveled is below a predetermined threshold, the email message is marked as possibly abusive for further consideration or the classifier may generate a weighted abuse score, which may be used together with a collection of other factors that each contributes a weighted score to calculate a final abuse score. In the later case, a determination whether the email message is abusive may be made based on the final abuse score.

In this description, the method is described as being performed by a classifier operated by an Internet Services Provider (ISP) or other Communications Services Provider (CSP). Note, however, that a classifier implementing the method can also be deployed at the end-user's machine, e.g., a desktop computer, laptop computer, cell phone, PDA, etc. Nonetheless, typically, the classifier will be operated by an ISP or CSP, although that also is not necessarily so. In any case, the final destination MTA will not be counted in determining whether the email message has traveled through any MTA before arriving at the final destination.

Figure 1:
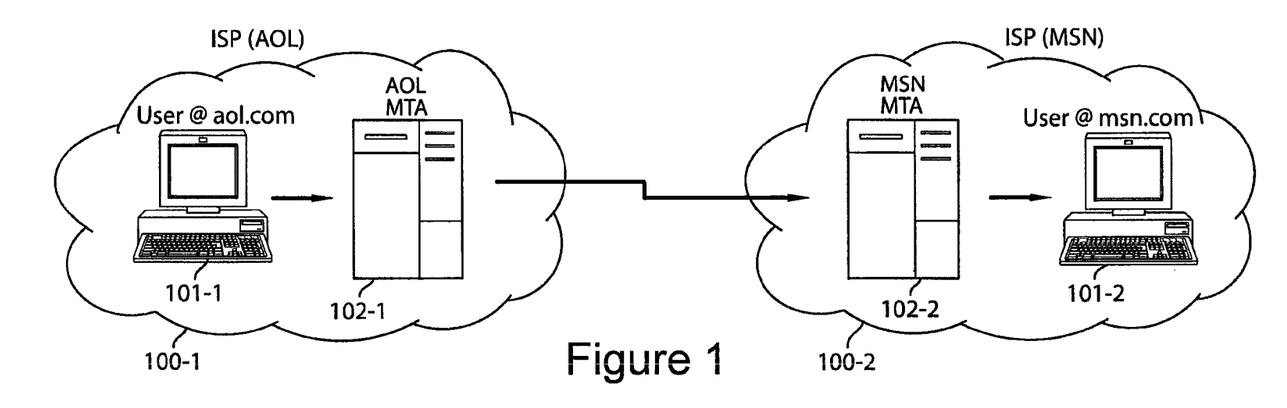
FIG. 1 illustrates an email flow from one user to another.

FIG. 1 illustrates an email flow from one user to another. When user1@aol.com 101-1 sends a message to user2@msn.com 101-2, it travels first through the AOL MTA 102-1 operated by AOL 100-1, where it receives a "Received:" header before the message is relayed to the MSN MTA 102-2 operated by MSN 100-2, where it receives a second "Received:" header, before it is ultimately delivered to user2@msn.com 101-2. So the message in question here has two "Received:" headers indicating two "hops". Accordingly, the message has one "hop" before it arrives at its final destination MTA, the MSN MTA 102-2. Note, however, that the message in FIG. 1 could have traveled through a number of intermediate MTAs before arriving at the MSN MTA 102-2. In that case, the message would have more than one "hop" before it arrives at its final destination MTA, the MSN MTA 102-2.

Figure 2:
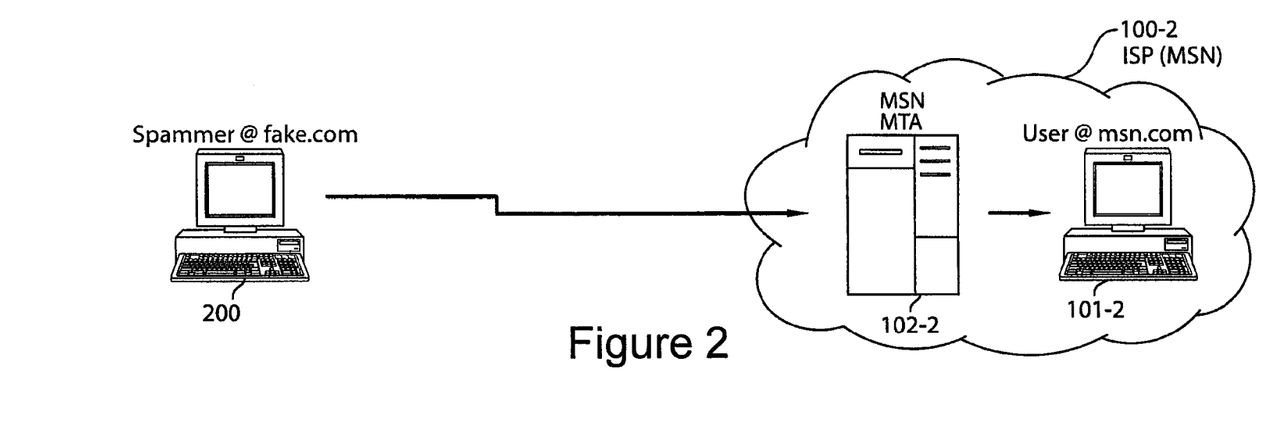
FIG. 2 illustrates an email flow from a spammer.

FIG. 2 illustrates an email flow from a spammer, i.e., spammer@fake.com 200. When spammer@fake.com 200 sends a message to user2@msn.com 101-2, he sends it directly (from his PC, for example) to the MSN MTA 102-2. Since the message did not travel through any other MTAs before arriving at the MSN MTA 102-2, it has no "Received:" headers, except the one inserted by its final destination MTA, the MSN MTA 102-2.

Figure 3A:
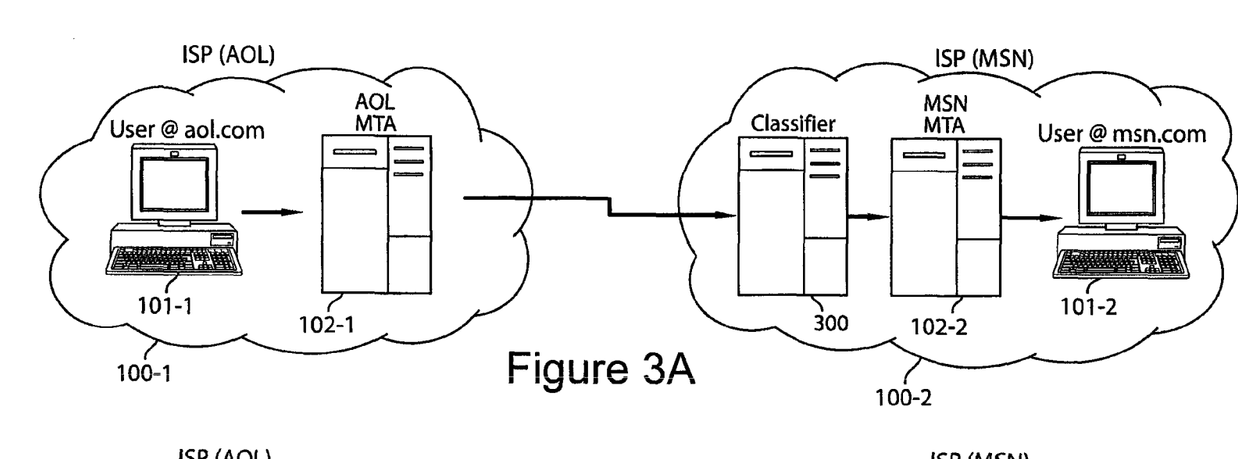
FIG. 3A illustrates an exemplary deployment architecture of the invention.

FIG. 3A illustrates an exemplary deployment architecture of the present invention. In this specific architecture, the Classifier 300 is operated by an ISP, MSN 100-2. The Classifier 300 inspects email messages intended for all MSN users. Note that the Classifier 300 may be deployed within MSN MTA 102-2, although FIG. 3A shows a standalone machine for Classifier 300. As shown, at the final destination, the Classifier 300 will examine the arriving email messages before they are processed by the MSN MTA 102-2. If, however, the MSN MTA 102-2 processes the arriving email messages before the Classifier 300 examines them, the Classifier 300 will not consider the final destination MTA (MSN MTA 102-2) in determining how many MTAs the email message has traveled through.

Figure 3B:
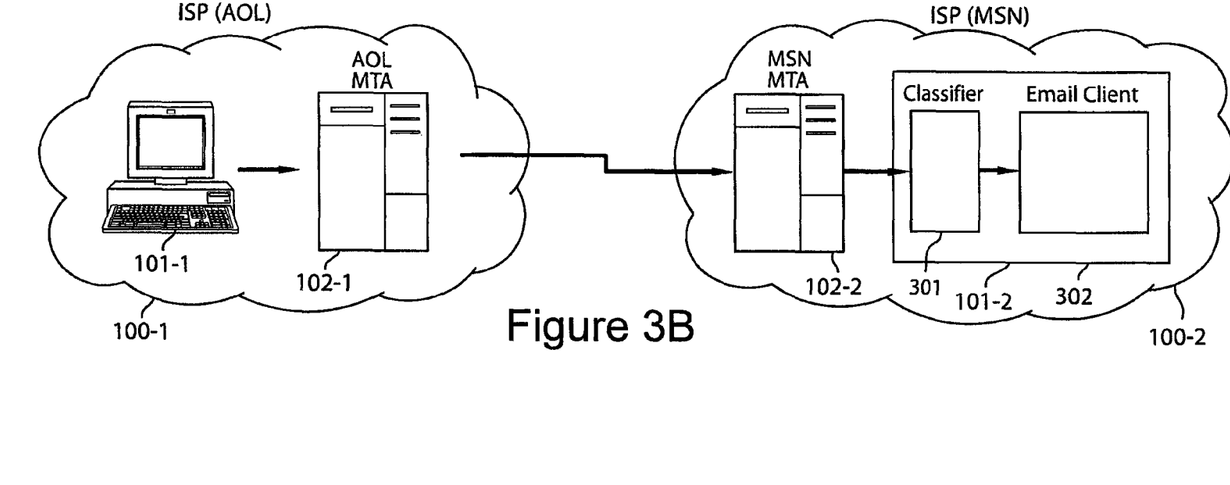
FIG. 3B illustrates another exemplary deployment architecture of the invention.

FIG. 3B illustrates another exemplary deployment architecture of the present invention, where the Classifier 301 is deployed within the end-user's machine, e.g., a desktop computer, laptop computer, cell phone, PDA, etc. While the Email Client 302 is downloading from the MSN MTA 102-2 the email messages intended for user2@msn.com, the downloaded email messages will be inspected by the Classifier 301 first. Abusive email messages will be blocked before reaching the Email. Client 302. As noted previously, the final destination MTA (MSN MTA 102-2) will not be considered by the Classifier 301 in determining the number of MTAs through which the email message has traveled before arriving at the final destination.

Figure 4:
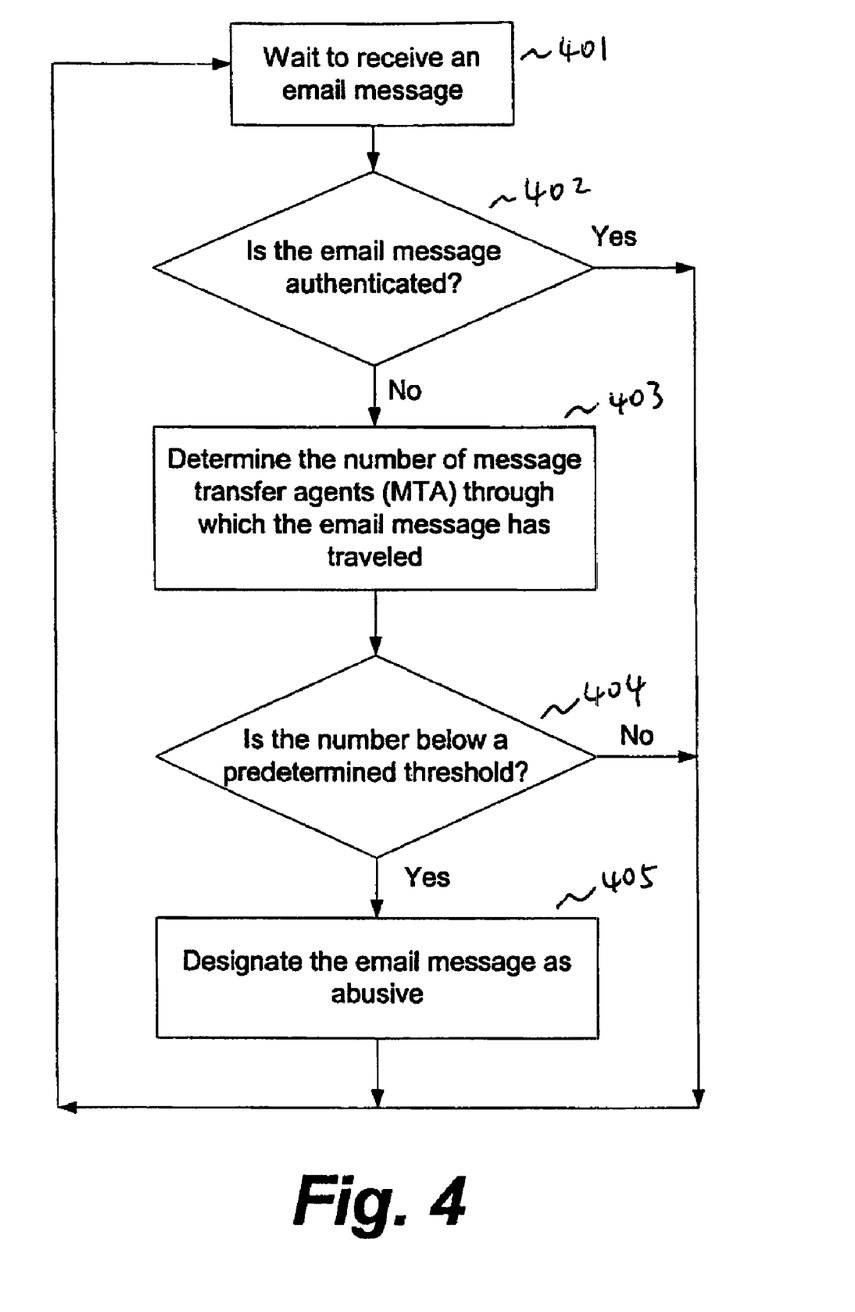
FIG. 4 is a flow diagram showing a process, according to a first embodiment, to detect an abusive email message.
Figure 5:
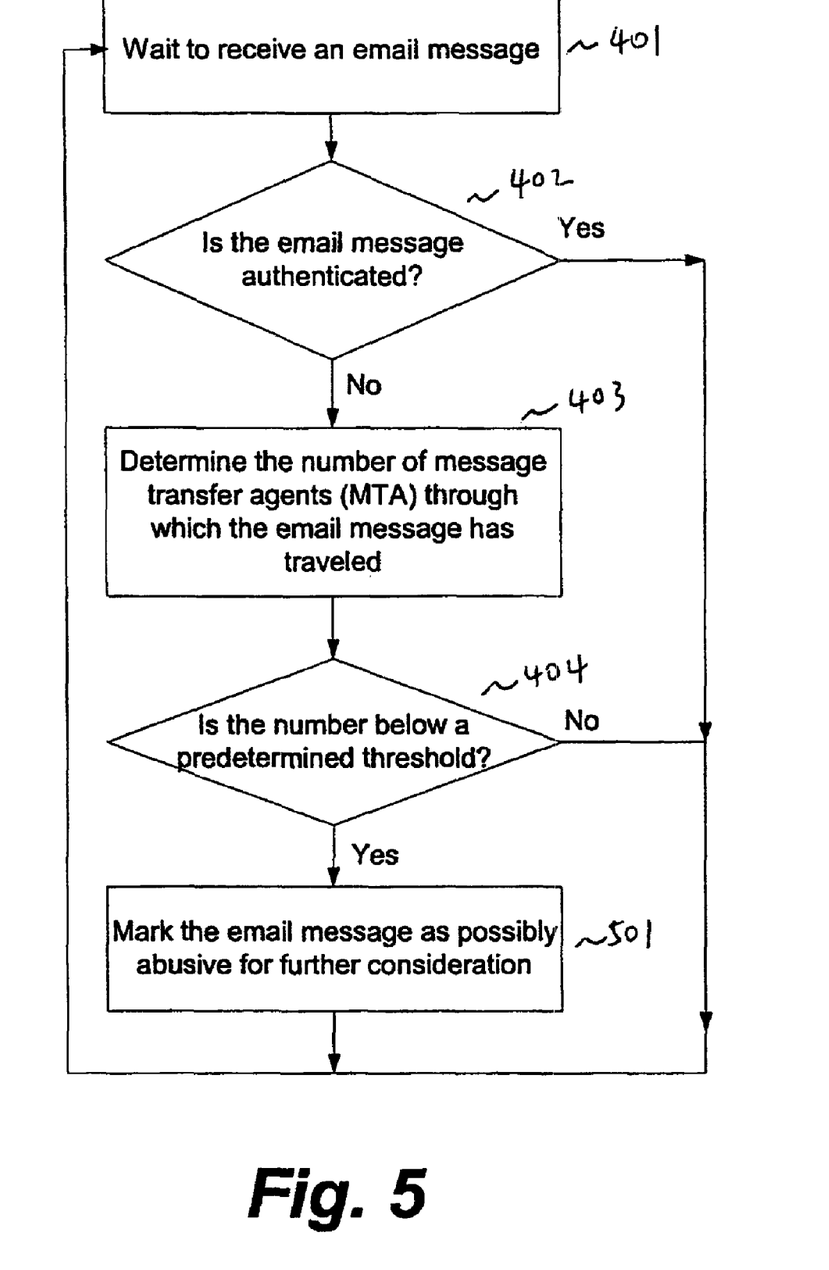
FIG. 5 is a flow diagram showing a process, according to a second embodiment, to detect an abusive email message.
Figure 6:
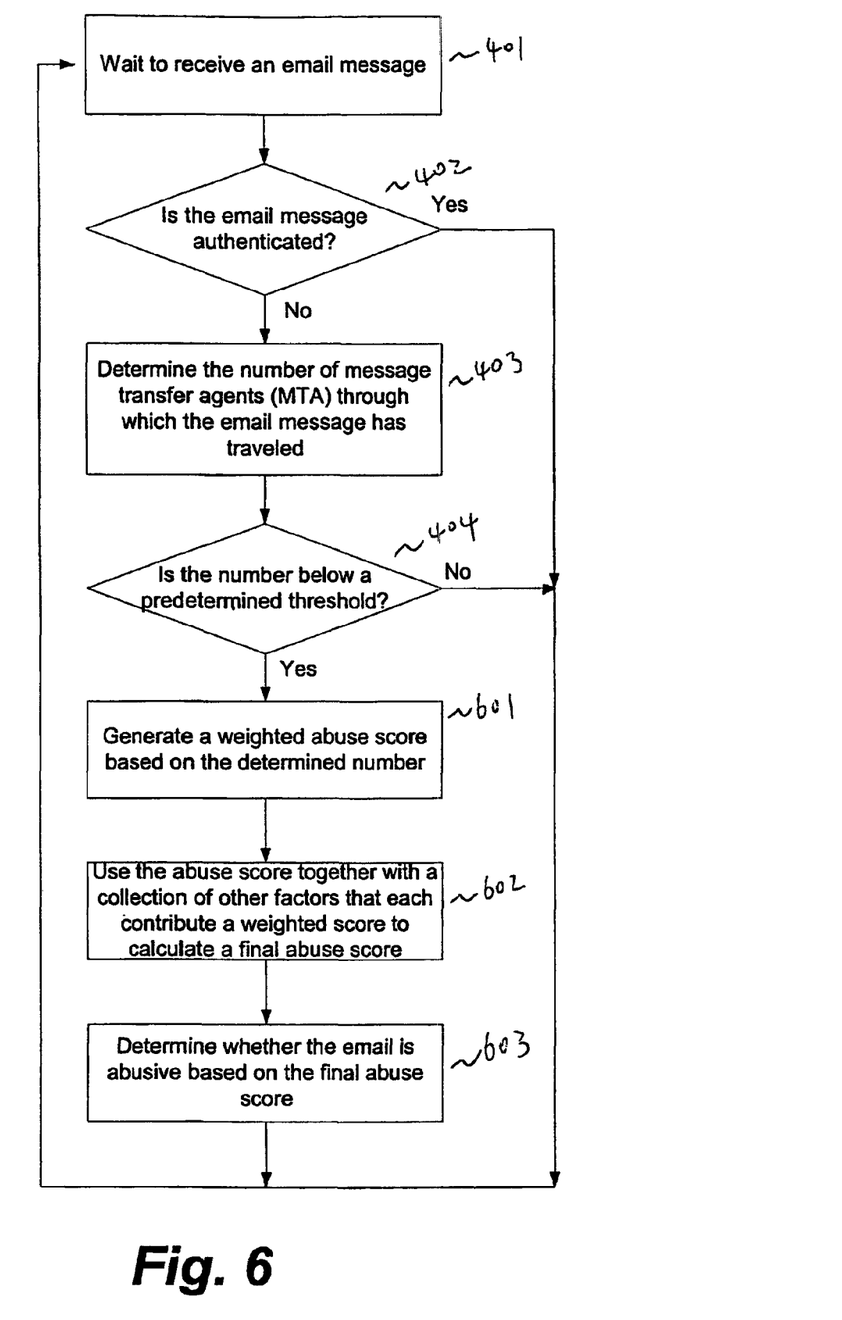
FIG. 6 is a flow diagram showing a process, according to a third embodiment, to detect an abusive email message.

FIG. 4 illustrates a process, according to a first embodiment, to detect abusive email messages. FIG. 5 and FIG. 6 respectively illustrate a process, according to a second and third embodiment, to contribute in the detection of abusive email messages.

In this first embodiment, the classifier initially at process block 401 waits for the arrival of an email message. At process block 402, the classifier determines whether the email message is authenticated. If the email message has a previous message or session authentication, for example, the email message is not considered to be abusive. Otherwise, the process proceeds to block 403, where the classifier determines how many MTAs the email message has traveled through. One way of doing that is to inspect the email message's headers to find out how many headers contain the prefix "Received:". Legitimate email travels through at least one MTA 102-1 before arriving at its final destination. Each MTA 102-1, 102-2 that a message travels through is known as a "hop". Each "hop" is recorded in the message with a header containing the prefix "Received:". If it is determined at process block 404 that the number of MTAs (excluding the final destination MTA) through which the email message has traveled is not below a predetermined threshold, for example one (1), then the email message is not considered to be abusive, and the process goes back to block 401 to start inspecting another email message. Otherwise, at block 405, the email message is designated as abusive. For purposes of the present invention, it is not important what is done with abusive messages; the technique is directed to how to identify messages which are abusive. In addition, the process to determine whether the email message is authenticated at block 402 may also take place after the determination that the number of MTAs through which the email message has traveled is below a predetermined threshold at block 404. In any case, the processing order is unimportant except for implementation considerations of performance and efficiency.

When the iteration of the process for this email message is finished, the process goes back to block 401 to wait for (or begin processing) another email message. Note that the process to inspect multiple email messages can also proceed concurrently if the processing system supports parallel or concurrent processing.

In the second embodiment (FIG. 5), the process is similar to the first embodiment at blocks 401, 402, 403, and 404, except that after the classifier determines at block 404 that the number of MTAs through which the email message has traveled is below a predetermined threshold, the email message is marked as possibly abusive for further consideration at block 501. For example, if the classifier has determined that an email message has made very few "hops", a header indicating the number of "hops" can be added to the email message to mark the email as possibly abusive. Then, the email message may be presented to the user for further consideration, or it may be passed to one or more other kinds of classifiers for a more thorough inspection.

In the third embodiment (FIG. 6), the process is similar to the first embodiment at blocks 401, 402, 403, and 404. After the classifier determines at block 404 that the number of MTAs through which the email message has traveled is below a predetermined threshold, the classifier generates a weighted score at block 601. At block 602, the generated score will be used together with a collection of other factors (e.g., patterns of email activity, the date of an email message, etc.) that each contributes a weighted score, to calculate a final abuse score for the email message. Depending on the algorithm of calculating the final abuse score, judgment can be made whether the email message should be blocked as abusive. For example, if the higher the abuse score is, the more likely the email message is abusive, then the email message should be designated as abusive if the score is above a certain threshold. Just as there are many algorithms of calculating the final abuse score, there are also many ways of making determinations about the email message based on the calculated final abuse score. By specifically describing the above example, it does not mean that it is the only way of using the final abuse score to make a judgment against the email message.

Figure 7:
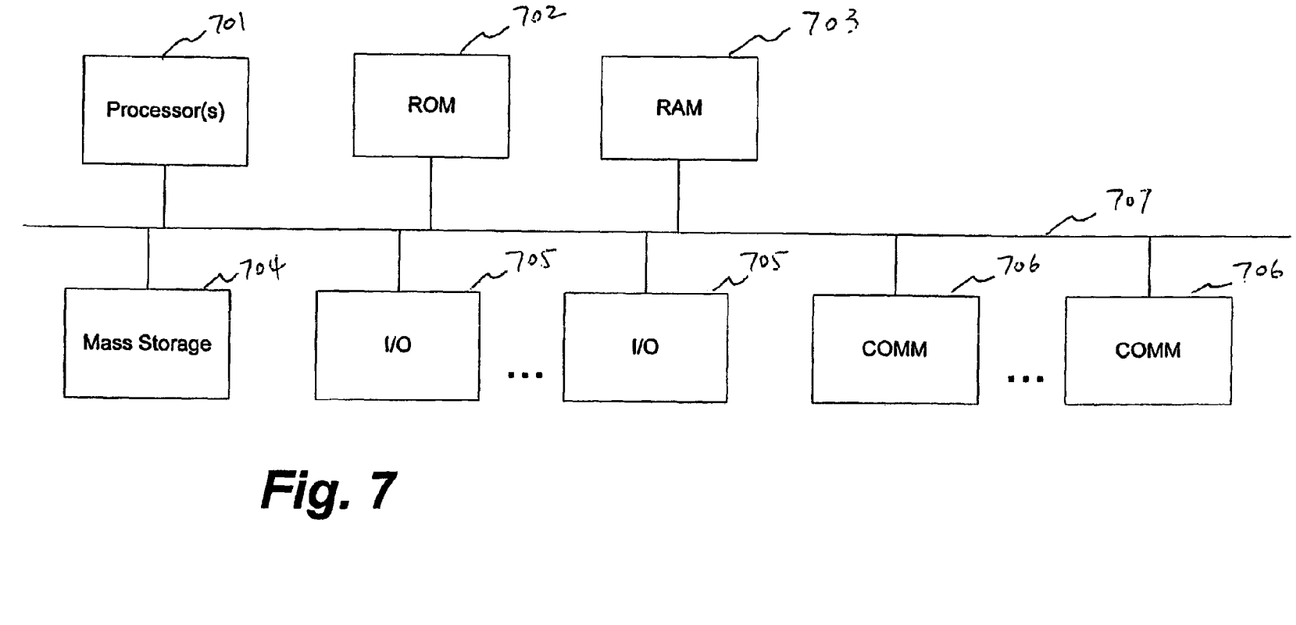
FIG. 7 is a block diagram of a processing system in which the invention can be implemented.

FIG. 7 is a block diagram of a processing system in which the described processes can be implemented. As noted, such processing system can be an MTA, an end user's computer or other device, or a separate machine connected to one of these devices. The illustrated processing system includes one or more processors 701, i.e. a central processing unit (CPU), read-only memory (ROM) 702, and random access memory (RAM) 703, each connected to a bus system 707. The processor(s) 701 may be, or may include, one or more programmable general-purpose or special-purpose microprocessors, digital signal processors (DSPs), application specific integrated circuits (ASICs), programmable logic devices (PLDs), or a combination of such devices. The bus system 707 includes one or more buses or other connections, which may be connected to each other through various bridges, controllers and/or adapters, such as are well-known in the art. For example, the bus system 707 may include a "system bus", which may be connected through one or more adapters to one or more expansion buses, such as a Peripheral Component Interconnect (PCI) bus, HyperTransport or industry standard architecture (ISA) bus, small computer system interface (SCSI) bus, universal serial bus (USB), or Institute of Electrical and Electronics Engineers (IEEE) standard 1394 bus (sometimes referred to as "Firewire").

Also coupled to the bus system 707 are one or more mass storage devices 704, input/output (I/O) devices 705 and data communication devices 706. Mass storage device 704 may be, or may include, any one or more devices suitable for storing large volumes of data in a non-volatile manner, such as a magnetic disk or tape, magneto-optical (MO) storage device, or any of various forms of Digital Versatile Disk (DVD) or Compact Disk (CD) based storage, or a combination thereof.

Each data communication device 706 is a device suitable for enabling the processing system to communicate data with remote devices or systems and may be, for example, a conventional modem, a Digital Subscriber Line (DSL) modem, a cable modem, an Ethernet adapter, an Integrated Services Digital Network (ISDN) adapter, a wireless transceiver (e.g., in the case of a mobile device), a satellite transceiver, or the like. The I/O device(s) 705 may include, for example, a keyboard or keypad, a display device, and a pointing device (e.g., a mouse, trackball, or touchpad). Note, however, that such I/O devices may be unnecessary for certain devices and/or in certain embodiments. For example, a device which functions purely as a server does not necessarily require local I/O devices aside from a data communication device, particularly if the server is not intended to directly interface with a user or operator. Many other variations on the above described embodiment are possible. Further, it will be understood that the processing system may include other conventional components such as are well-known in the art.

The processes described above may be implemented in software, which may reside, either partially or completely, in any of RAM 703, mass storage device 704 and/or ROM 702, as shown.

Thus, a method and apparatus for detecting abusive emails based on number of "hops" have been described. Although the present invention has been described with reference to specific exemplary embodiments, it will be evident that various modifications and changes may be made to these embodiments without departing from the broader spirit and scope of the invention as set forth in the claims. Accordingly, the specification and drawings are to be regarded in an illustrative sense rather than a restrictive sense.

What is claimed is:

1. A computer-implemented method, comprising:
    at a computer having one or more processors and memory for storing instructions and data:
        determining the number of message transfer agents through which an email message has traveled; and
        designating the email message as abusive if a predetermined set of conditions is satisfied, the predetermined set of conditions including that the number of message transfer agents through which the email message has traveled is less than a predetermined number of message transfer agents.

2. The computer-implemented method as recited in claim 1, wherein the predetermined set of conditions further includes that the email message has not otherwise been authenticated.

3. The computer-implemented method as recited in claim 2, wherein said otherwise authenticated comprises authenticated by having a previous message authentication.

4. The computer-implemented method as recited in claim 2, wherein said otherwise authenticated comprises authenticated by having a previous session authentication.

5. The computer-implemented method as recited in claim 1, further comprising indicating in the email message the number of message transfer agents through which the email message has traveled.

6. The computer-implemented method as recited in claim 1, wherein said determining comprises obtaining the number of predefined headers that the email message has, each said predefined header having been inserted by a message transfer agent as a result of the email message traveling through the message transfer agent.

7. The computer-implemented method as recited in claim 6, wherein at least one of the predefined headers is inserted into the email message to record the event of the message transfer agent's receiving of the email message.

8. The computer-implemented method as recited in claim 1, further comprising:
    using the number of message transfer agents through which the email has traveled and a plurality of other factors that each contribute a weighted score to calculate a final abuse score; and
    comparing the final abuse score with a predetermined threshold and designating said email message as abusive if the final abuse score has a specified relationship to the predetermined threshold.

9. The computer-implemented method as recited in claim 1, further comprising:
    marking the email message as possibly abusive for further consideration if the number of message transfer agents through which the email message has traveled is less than the predetermined number of message transfer agents.

10. The computer-implemented method as recited in claim 9, wherein marking comprises adding a header to said email message indicating the number of message transfer agents through which the email message has traveled.

11. A computer system for detecting abusive email messages, comprising:
    one or more processors; and
    memory for storing one or more computer programs therein, wherein the one or more computer programs, when executed by the one or more processors, cause the computer system to:

determine the number of message transfer agents through which an email message has traveled; and designate the email message as abusive if a predetermined set of conditions is satisfied, the predetermined set of conditions including that the number of message transfer agents through which the email message has traveled is less than a predetermined number of message transfer agents.

12. The computer system as recited in claim 11, wherein the predetermined set of conditions further includes that the email message has not otherwise been authenticated.

13. The computer system as recited in claim 12, wherein said otherwise authenticated comprises authenticated by having a previous message authentication.

14. The computer system as recited in claim 12, wherein said otherwise authenticated comprises authenticated by having a previous session authentication.

15. The computer system as recited in claim 11, wherein the one or more computer programs further comprise instructions for indicating in the email message the number of message transfer agents through which the email message has traveled.

16. The computer system as recited in claim 11, wherein said determining instruction further comprises instructions for obtaining the number of predefined headers that the email message has, each said predefined header having been inserted by a message transfer agent as a result of the email message traveling through the message transfer agent.

17. The computer system as recited in claim 16, wherein at least one of the predefined headers is inserted into the email message to record the event of the message transfer agent's receiving of the email message.

18. The computer system as recited in claim 11, wherein the one or more computer programs further comprise instructions for:

using the number of message transfer agents through which the email has traveled and a plurality of other factors that each contribute a weighted score to calculate a final abuse score; and comparing the final abuse score with a predetermined threshold and designating said email message as abusive if the final abuse score has a specified relationship to the predetermined threshold.

19. The computer system as recited in claim 11, wherein the one or more computer programs further comprise instructions for:

marking the email message as possibly abusive for further consideration if the number of message transfer agents through which the email message has traveled is less than the predetermined number of message transfer agents.

20. The computer system as recited in claim 19, wherein said marking instruction further comprises instructions for adding a header to said email message indicating the number of message transfer agents through which the email message has traveled.

* * * * *